United States Patent [19]

Aono et al.

[11] 4,338,665

[45] Jul. 6, 1982

[54] DATA GATHERING SYSTEM FOR AUTOMOTIVE VEHICLES

[75] Inventors: Shigeo Aono, Tokyo; Sadao Takase, Yokohama, both of Japan

[73] Assignee: Nissan Motor Company, Limited, Yokohama, Japan

[21] Appl. No.: 154,768

[22] Filed: May 30, 1980

[30] Foreign Application Priority Data

May 31, 1979 [JP] Japan ................................ 54-67709

[51] Int. Cl.³ ................................................ G06F 15/20

[52] U.S. Cl. .................................... 364/424; 364/571; 340/347 CC

[58] Field of Search ............... 364/424, 425, 550, 571; 340/347 CC, 347 NT, 52 F

[56] References Cited

U.S. PATENT DOCUMENTS

| | | | |
|---|---|---|---|
| 3,725,903 | 3/1973 | Kosakowski | 340/347 NT |
| 3,781,824 | 12/1973 | Caiati et al. | |
| 4,034,364 | 7/1977 | Fukuda et al. | 340/347 NT |
| 4,063,236 | 12/1977 | Amemiya et al. | 340/347 NT |
| 4,072,850 | 2/1978 | McGlynn | 364/424 |
| 4,081,800 | 3/1978 | Amemiya et al. | 340/347 NT |
| 4,128,885 | 12/1978 | Valek et al. | 340/347 NT |
| 4,155,116 | 5/1979 | Tawfik et al. | 364/424 |
| 4,190,823 | 2/1980 | Leichle | 340/347 CC |
| 4,207,611 | 6/1980 | Gordon | 364/571 |
| 4,222,107 | 9/1980 | Mrozowski et al. | 364/571 |
| 4,236,215 | 11/1980 | Callahan et al. | 364/424 |

FOREIGN PATENT DOCUMENTS 2322299 7/1975 Fed. Rep. of Germany .

*Primary Examiner*—Mark E. Nusbaum

*Assistant Examiner*—Gary Chin

*Attorney, Agent, or Firm*—Schwartz, Jeffery, Schwaab, Mack, Blumenthal & Koch

[57] ABSTRACT

A data gathering system is disclosed for use with an automotive vehicle. The system includes an A/D converter for converting an input analog value into a corresponding digital value, a multiplexor having a number of data channels for transferring vehicle operation variable indicative analog values to the A/D converter when rendered conductive, and a digital computer for selectively rendering the data channel conductive in a predetermined sequence. The digital computer is adapted to correct the converted values according to supply voltage variations and store the corrected values therein.

3 Claims, 10 Drawing Figures

DATA GATHERING SYSTEM FOR AUTOMOTIVE VEHICLES

BACKGROUND OF THE INVENTION

1. Field of the Invention

This invention relates to a data gathering system for use in an automotive vehicle for gathering data on engine operating variables and, more particularly, to such a system including an A/D converter.

2. Description of the Prior Art

A/D converters used in process control and measurement systems are designed to be operable with a sufficiently regulated power supply. In applications where such an A/D converter is used in an automotive vehicle for converting analog signals being indicative of various engine operating conditions into corresponding digital signals for application to the associated data processing unit, it is normally powered by a car battery exhibiting relatively large voltage drops at the start of actuation of the starting motor and electrical loads such as head lights. The battery voltage could drop to half the rated voltage if the ambient temperature is low or the car battery is dissipated.

Although the associated digital computer can be driven even when the battery exhibits such large voltage drops with the use of a power circuit designed to output a low regulated voltage, this results in limited sensor output voltage and limited A/D converter accuracy. Furthermore, errors are introduced in the A/D converter output due to battery voltage variations as well as offset and drift in the operational amplifier of the A/D converter.

SUMMARY OF THE INVENTION

It is therefore an object of the present invention to provide a data gathering system for use with an automotive vehicle which can obtain accurate data on vehicle operating variables independently of supply voltage variations.

BRIEF DESCRIPTION OF THE DRAWINGS

The present invention will be described in greater detail by reference to the following description taken in connection with the accompanying drawings, in which.

DESCRIPTION OF THE PREFERRED EMBODIMENTS

Figure 1:
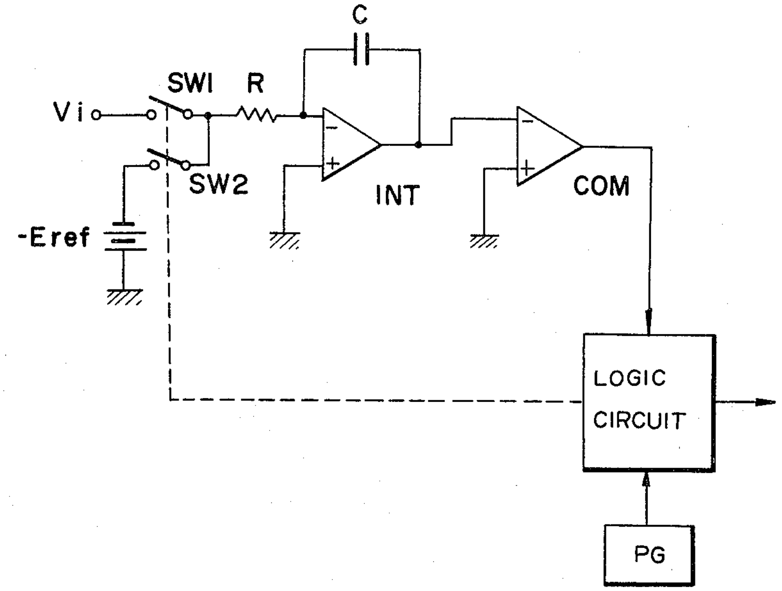
FIG.1 (PRIOR ART)
FIG. 1 is a circuit diagram showing a conventional duel ramp A/D converter.

Prior to the description of the preferred embodiments of the present invention, we shall briefly describe the prior art A/D converter in FIG. 1 in order to specifically point out the difficulties attendant thereon.

Referring to FIG. 1, the conventional A/D converter is of the dual ramp type which includes an integrator INT with one input connected through a first switch $SW_1$ to an input analog signal Vi and through a second switch $SW_2$ to a reference voltage −Eref of the polarity opposite to that of the input analog signal. The other input of the integrator INT is grounded and the output thereof is connected to a comparator COM, the other input of which is grounded and the output thereof is connected to a logic circuit.

Figure 2:
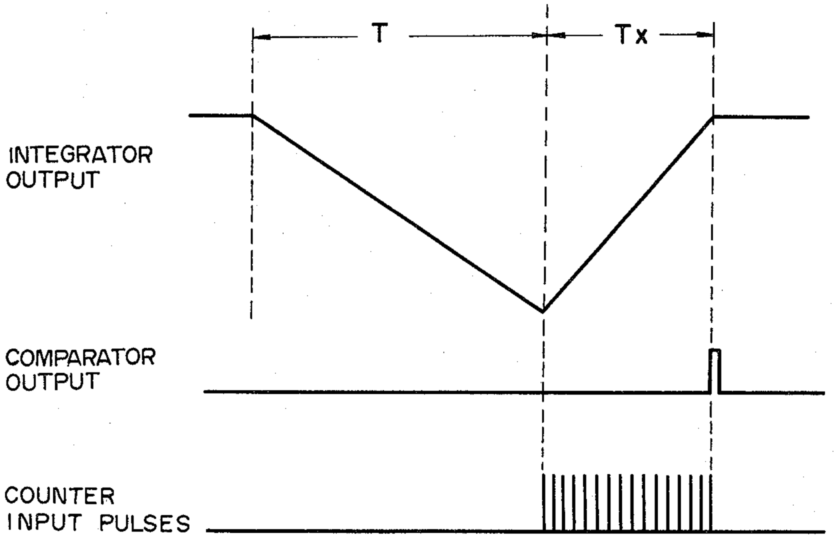
FIG.2 (PRIOR ART)
FIG. 2 is a diagram used in explaining the operation of the A/D converter of FIG. 1.

At the start of the A/D converting operation of the dual ramp A/D converter of FIG. 1, the logic circuit turns the first switch $SW_1$ on to conduct the input analog signal Vi to the one input of the integrator INT which integrates the input analog signal Vi for a predetermined time T, as shown in FIG. 2. When the time T is elapsed, the logic circuit turns the first switch $SW_1$ off while at the same time turns the second switch $SW_2$ on to conduct the reference voltage −Eref to the integrator INT. The integrator INT integrates the reference voltage −Eref, as shown in FIG. 2. When the output of the integrator INT reaches the initial level or zero, the comparator COM provides at its output a pulse, as shown in FIG. 2, which is applied to the logic circuit. The logic circuit includes a counter for counting clock pulses applied thereto from a clock pulse generator PG until the pulse from the comparator COM is applied to the logic circuit after the second switch $SW_2$ is turned on as shown in FIG. 2. The logic circuit provides an output corresponding the number of clock pulses counted by the counter which represents the time Tx for which it takes the integrator INT to integrate the reference voltage −Eref. The time Tx corresponsing to the output of the dual ramp A/D converter of FIG. 1 is given by:

$$Tx = Vi\ T/E\mathrm{ref}$$

In this equation, the value Eref, although it is constant if the voltage of the power source is fully regulated, is not constant with a car battery being used as a power source except when the engine is under steady operating conditions. As a result, errors are introdued in the A/D converter output due to battery voltage variations as well as offset and drift in the integrator INT.

Similarly to such dual ramp A/D converters, boosting charge, constant-current discharge type A/D converters have been used which include a charge and discharge circuit having a small time constant for rapid charging and a constant-current circuit through which the circuit is discharged. Such boosting charge, constant-current discharge type A/D converters can operate at higher speed than dual ramp A/D converters.

Figure 3:
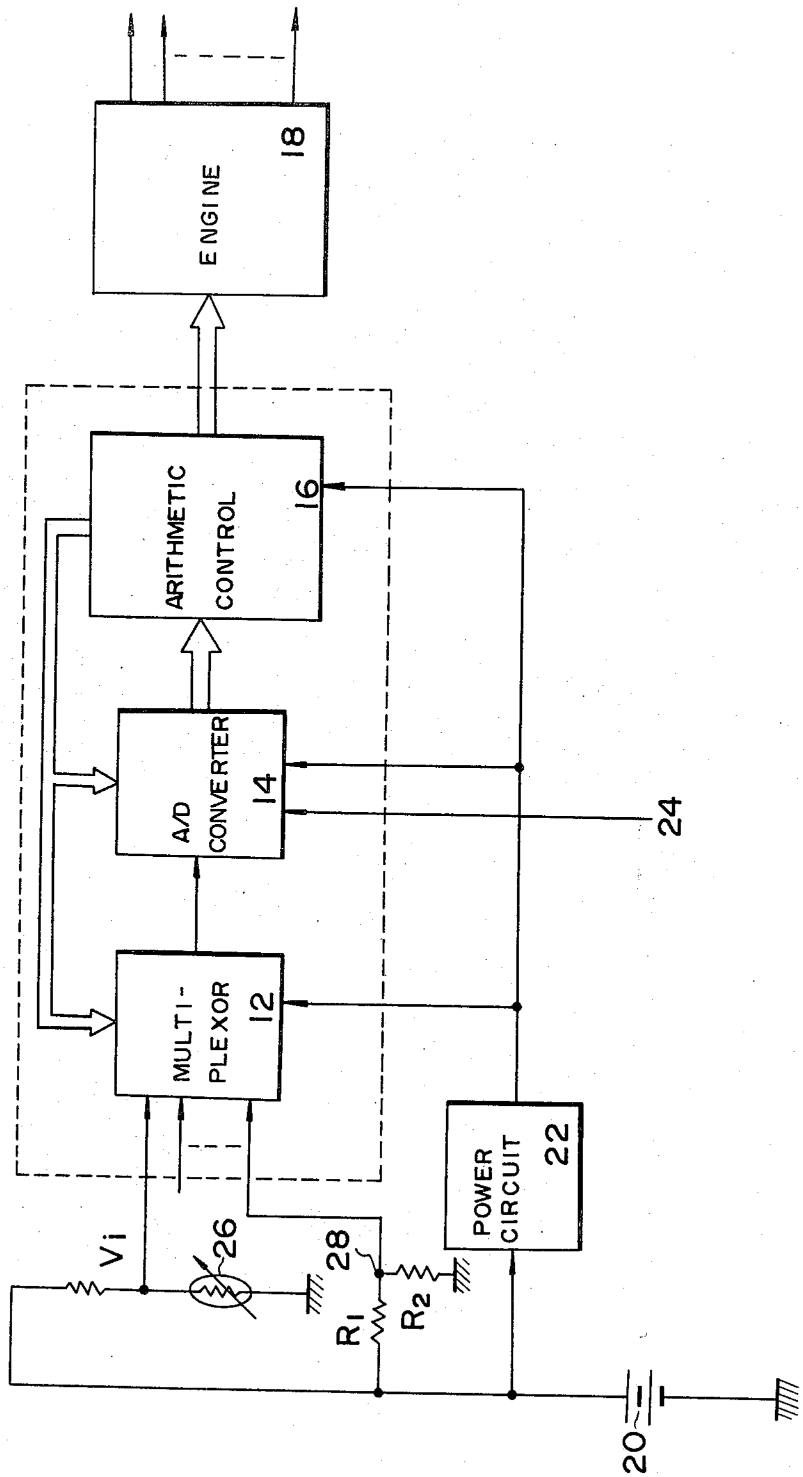
FIG. 3 is a block diagram showing one embodiment of a data gathering system made in accordance with the present invention.

Referring to FIG. 3, there is illustrated one embodiment of a data gathering system made in accordance with the present invention. The data gathering system comprises a multiplexor 12 having a number of different data channels for selective connection of its inputs to its output, an A/D converter 14 for converting an analog signal transferred from the multiplexor 12 into a corresponding digital signal, and an artithmetic controller or digital computer 16 for controlling the channel selection of the multiplexor 12 and also controlling the operation of an engine 18 in accordance with data transferred from the A/D converter 14. The multiplexor 12, A/D converter 14, and arithmetic digital computer 16 are powered from a car battery 20 through a power circuit 22.

The multiplexor 12 has inputs from various sensors, one of which is illustrated as at 26, each monitoring an engine operating variable and providing an analog signal corresponding to the engine operating variable. The sensors may include, but are in no way limited to, oxygen, engine coolant temperature, catalytic converter temperature, and battery voltage sensors. The multiplexor 12 receives additional input signals indicative of maximum and minimum voltages permissible in the A/D converter 14.

Figure 4:
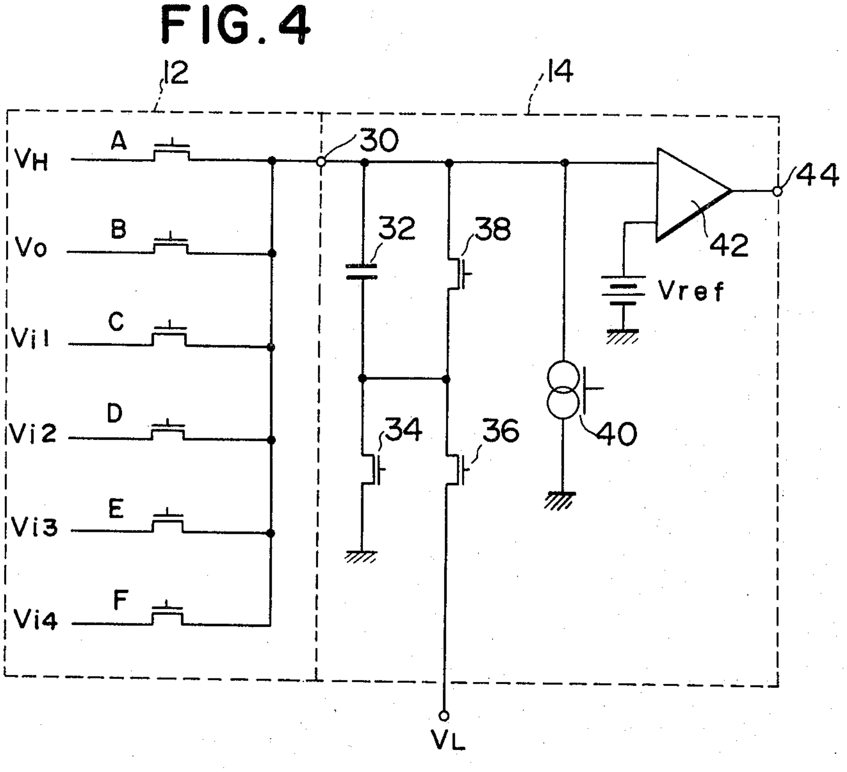
FIG. 4 is a circuit diagram showing the detail structure of the A/D converter of FIG. 3.

Referring to FIG. 4, the multiplexor 12 and the A/D converter 14 will be described in greater detail. The multiplexor 12 has different data channels A to F for transferring to the A/D converter 14 a maximum permissible voltage indicative signal $V_H$, a minimum permissible voltage indicative signal Vo, an oxygen sensor output indicative signal $Vi_1$, an engine coolant temperature indicative signal $Vi_2$, a catalytic converter temperature indicative signal $Vi_3$, and a battery voltage indicative signal $Vi_4$, respectively. The channel selection of the multiplexor 12 is controlled in accordance with a program to be described later which is performed in the digital computer 16. The A/D converter 14 is illustrated as being of the boosting charge, constant-current discharge type which includes a capacitor 32 with its one end connected to the input terminal 30 of the A/D converter 14 and the other end connected through a first switch 34 to ground and also through a second switch 36 to a constant voltage $V_L$. The capacitor 32 is parallelled by a third switch 38. The one end of the capacotir 32 is connected through a constant-current circuit 40 to ground and also to one input of a comparator 42. The other input of the comparator 42 is connected to a reference voltage Vref and the output thereof is connected to the output terminal 44 of the A/D converter 14.

Figure 5:
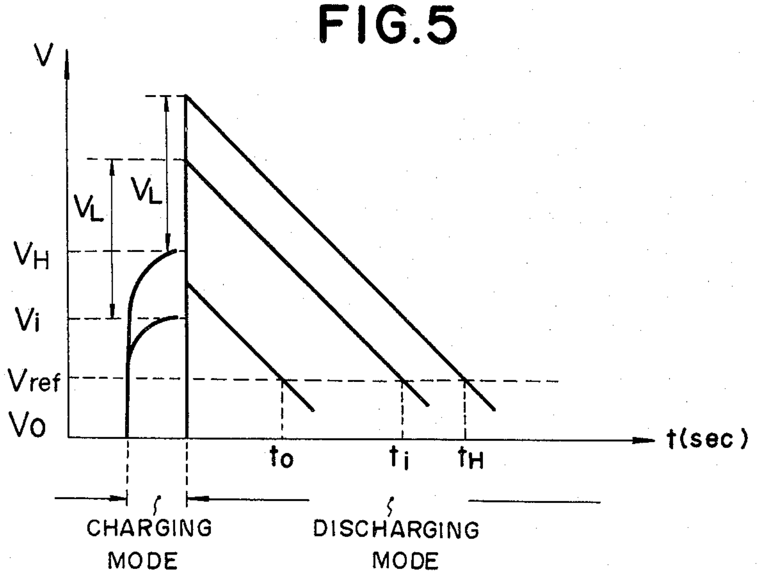
FIG. 5 is a diagram used to explain the operation of the A/D converter of FIG. 4.

Referring to FIG. 5, the operation of the current of FIG. 4 will be described. At a constant interval, for example, 10 m.sec., the digital computer 16 provides a control signal to the multiplexor 12 so that one of the data channels A to F, which is previously selected in accordance with a program performed in the digital computer 16, is rendered conductive to transfer an input analog signal to the A/D converter 14. Assuming now that the data channel A is selected and a maximum permissible voltage $V_H$ is connected to the input terminal 30 of the A/D converter 14, the capacitor 32 is rapidly charged to a voltage value corresponding to the maximum permissible voltage $V_H$ with the first switch 34 being rendered conductive. This charging mode of operation continues for a predetermined time of period. At the end of the charging mode of operation, the first switch 34 is turned off and the second switch 36 is turned on so as to increase the voltage across the capacitor 32 by a constant voltage $V_L$. Following this, the constant-current circuit 40 is turned on to discharge the capacitor 32. Such a discharge mode of operation is terminated when the voltage across the capacitor 32 drops to a reference or threshhold value Vref. When the capacitor voltage reaches the reference voltage Vref, the comparator 44 provides a pulse to the digital computer 16 which thereby turns the second switch 36 off while at the same time turns the first and third switches 34 and 38 on so as to reset the capacitor 32. The digital computer 16 counts clock pulses applied thereto during the discharge mode of operation. The number of the clock pulses counted by the computer corresponds to the time tH during which the A/D converter 14 is in its discharge mode of operation. If the battery voltage is constant, the digital value $(V_H)c$ into which the maximum permissible voltage is converted is represented by (tH−tO).

The time tO corresponds to the time during which A/D converter 14 is placed in its discharge mode of operation where the voltage $(V_o+V_L)$ across the capacitor 32 falls to the reference voltage Vref.

In the case where another data channel is selected and an input analog signal Vi is transferred therethrough to the A/D converter 14, the number of clock pulses counted by the computer corresponds to the time ti during which the A/D converter 14 is placed in its discharge mode of operation where the voltage $(V_i+V_L)$ across the capacitor 32 falls to the reference voltage Vref. The digital value (Vi)c into which the input analog signal Vi is converted is represented by (ti−tO) if the battery voltage is constant. If the battery voltage is not constant, the value (Vi)c should be corrected by multiplying the value (ti−tO) by a correction factor $(V_H)c/(tH-tO)$. That is, the input analog value Vi is converted into a digital value as expressed by:

$$(Vi)c = (ti - tO) \times \frac{(V_H)c}{(tH - tO)}$$

The operation of the computer 16 will be further described with reference to FIGS. 6 and 7 which are flow diagrams of the computer program performed. One selected data channel is rendered conductive to transfer one input signal to the A/D converter at a constant interval, for example 10 m.sec. and an interrupt occurs to start the computer program each time the computer 44 provides a pulse to the computer 16. The computer 16 is adapted to select, at first, the data channel A for transferring a maximum permissible voltage indicative signal to the A/D converter 14.

At the point $P_1$ of the program, a determination is made as to whether the data channel A is selected. If the channel A is selected, the program is transferred along the YES branch to point P2 where a determination is made whether the engine is running. If the engine is not running, the data channel B for transferring a minimum permissible voltage indicative signal to the A/D converter 14 is selected and then the program is transferred to a point P29. Otherwise, the program is transferred to a point $P_3$ at which a determination is made as to whether the starter switch is on or off, that is, whether the starter motor is on or off. If the starter switch is on, the program is transferred to the point $P_4$. If the starter switch is off, the program is transferred to a point $P_5$ at which the channel C for transferring an oxygen sensor output indicative signal to the A/D converter 14 is selected and then is transferred to the point $P_{29}$.

At the point $P_1$, if the channel A is not selected, the program is transferred to a point $P_6$ at which another determination is made as to whether the channel B is selected. If the channel B is selected, the program is transferred along the YES branch to a point $P_7$ at which a determination is made as to whether the engine is running. If the engine is running, the program is transferred to a point $P_8$ at which a determination is made as to whether the starter switch is on or off. If the starter switch is off, the program is transferred to a point $P_{10}$ at which the channel C is selected and then to a point $P_{28}$. At the point $P_7$, when the engine is not running, or at the point P8, when the starter switch is on, the program is transferred to a point $P_9$ at which the channel D for transferring an engine coolant temperature indicative signal to the A/D converter 14 is selected and then to the point $P_{28}$.

If the channel B is not selected at the point $P_6$, the program is transferred to $P_{11}$ at which a determination is made as to whether the engine is running. If the engine is running, the program is transferred to a point $P_{12}$ at which another determination is made as to whether the starter switch is on or off. If the engine is not running at the point 11 or the starter switch is on at the point $P_{12}$, the program is transferred to a point $P_{13}$ at which a determination is made as to whether the channel D is selected. If the channel D is selected, the program is transferred to a point $P_{14}$ at which the channel F for transferring a battery voltage indicative signal to the A/D converter 14 is selected and then is transferred to a point $P_{27}$. Otherwise, the program is transferred to a point $P_{15}$ at which the channel A is selected and then to the point $P_{27}$.

If the starter switch is off at the point $P_{12}$, the program is transferred to a point $P_{16}$ at which a 4-bit counter is incremented by 1. If the carry is 1 at the point $P_{17}$, the program is transferred to a point $P_{18}$ at which the channel B is selected and then to the point $P_{27}$. If the carry is 0, the program is transferred to a point $P_{19}$ at which a determination is made as to whether the content of the counter is 1000. If the counter content is 1000, the program is transferred to the point $P_{15}$. Otherwise, the program is transferred to a point $P_{20}$ at which a determination is made as to whether the counter content is xxx1. The mark "x" indicates "0" or "1". If the counter content is xxx1, the program is transferred to a point $P_{24}$ at which the channel C is selected and then to the point $P_{27}$. Otherwise, the program is transferred to a point $P_{21}$ at which a determination is made as to whether the counter content is xx1x. If the counter is xx1x, the program is transferred to a point $P_{25}$ at which the channel E for transferring catalytic converter temperature indicative signal is selected and then is transferred to the point $P_{27}$. Otherwise, the program is transferred to a point $P_{22}$ at which a determination is made as to whether the counter content is x1xx. If the counter content is x1xx, the program is transferred to a point $P_{14}$ and then to the point $P_{27}$. Otherwise, the program is transferred to the point $P_{23}$ at which a determination is made as to whether the counter contact is 1xxx. If the counter content is 1xxx, the program is transferred to the point $P_{26}$ and then to the point $P_{27}$. Otherwise, the program is transferred directly to the point $P_{27}$.

Figure 6:
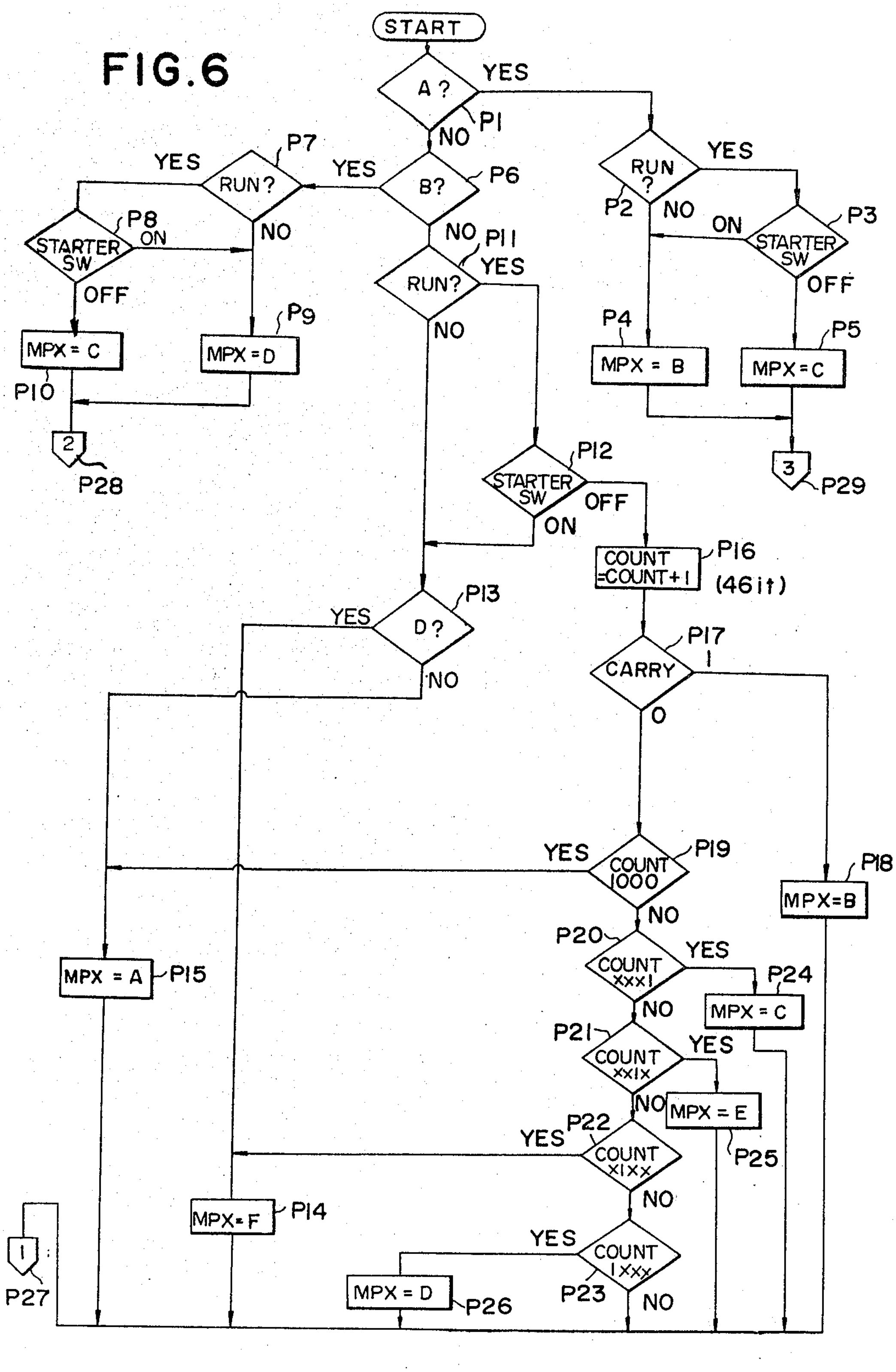
FIGS. 6 and 7 are flow diagrams showing the programming of the digital arithmetic control of FIG. 4 as it is used to control the operation of the A/D converter.
Figure 7:
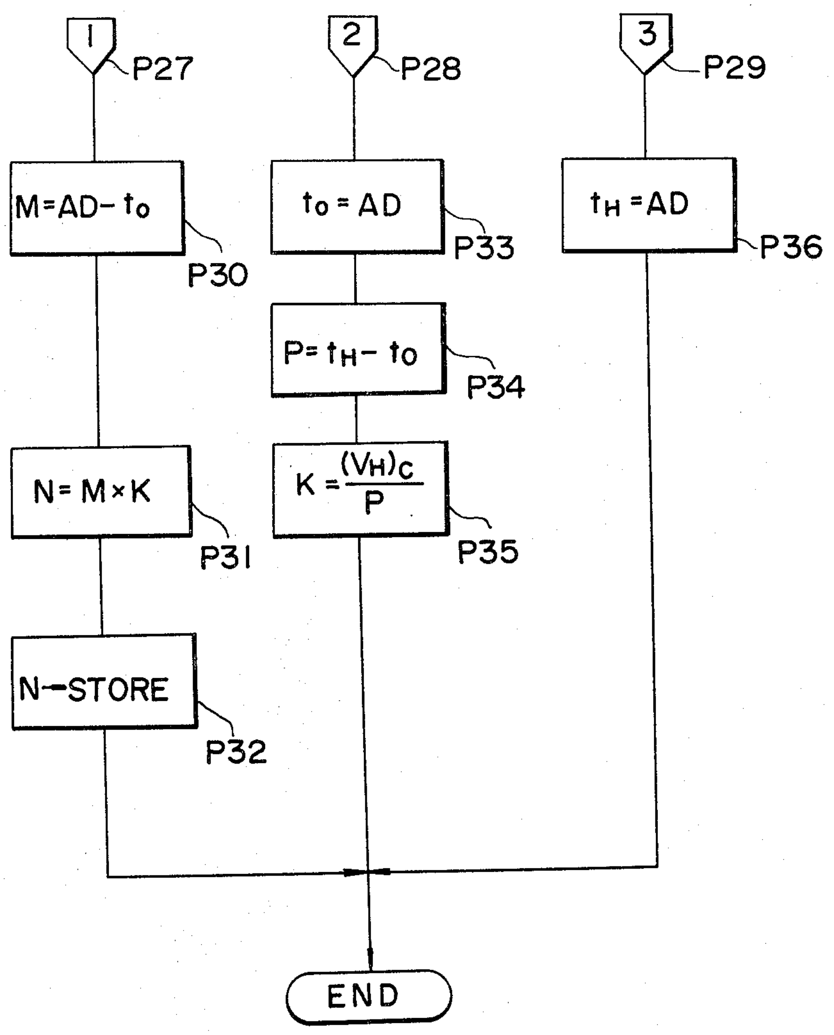

From the point $P_{29}$ in FIG. 7, which corresponds to the point $P_{29}$ of FIG. 6, the program is transferred to a point $P_{36}$ at which the value tH appearing at the output of the A/D converter is stored. From the point $P_{28}$ in FIG. 7, which corresponds to the point $P_{28}$ of FIG. 6, the program is transferred to a point $P_{33}$ at which the value tO is stored. The program is then transferred to a point $P_{34}$ at which a calculation is made to obtain a difference $P = tH - tO$. At the following point $P_{35}$, an additional calculation is made to obtain a quotient $K = (V_H)c/P$; that is, a correction factor $(V_H)c/(tH - tO)$. From the point $P_{27}$ in FIG. 7, which corresponds to the point $P_{27}$ of FIG. 6, the program is transferred to a point $P_{30}$ at which a calculation is made to obtain a difference $M = AD - tO$, wherein AD is the value appearing at the output of the A/D converter just before the computer program is entered. The program is then transferred to a point $P_{31}$ at which a calculation is made to obtain a product $N = M \times K$; that is the converted value corresponding to the input analog signal. At the following point $P_{32}$, the value N is stored.

Assuming that the engine is not running and the start switch is off, the operation will be further described. First, the data channel A is rendered conductive to transfer the maximum permissible voltage $V_H$ to the A/D converter 14 and a corresponding value tH is obtained. At the end of the A/D converting operation, an interrupt occurs and the program is entered. The program is transferred through the points $P_1$ and $P_2$ to the point $P_4$ at which the channel B is selected and hence through the point $P_{29}$ to the point $P_{36}$ at which the value tH is stored.

A predetermined time, for example, 10 m.sec. after the data channel A becomes conductive, the data channel B, which was selected at the point $P_4$ during the first program performance, is rendered conductive to transfer the minimum permissible voltage $V_o$ to the A/D converter 14 and a corresponding value to is obtained. At the end of the second A/D converting operation, an interrupt occurs and the program is entered again. The program is transferred through the points $P_1$, $P_6$ an $P_7$ to the point $P_9$ at which the channel D is selected and hence through the point $P_{28}$ to the point $P_{33}$ where the value tO is stored. Then, the value $P = tH - tO$ is obtained at the point 34. At the following point $P_{35}$, the correction factor $K = (V_H)c/(tH - tO)$ is obtained.

A predetermined time after the data channel B becomes conductive, the data channel D, which was selected at the point $P_9$ during the second program performance, is rendered conductive to transfer the engine coolant temperature indicative voltage $Vi_2$ to the A/D converter 14 and a corresponding value $ti_2$ is obtained. At the end of the third A/D converting operation, an interrupt occurs and the program is entered again. The program is transferred through the points $P_1$, $P_6$, $P_{11}$ and $P_{13}$ to the point $P_{14}$ at which the data channel F is selected and hence through the point 27 to the point $P_{30}$ at which a difference $M = ti_2 - tO$ is obtained. At the following point $P_{31}$, the converted value $N = (ti_2 - tO)(V_H)c/(tH - tO)$ is obtained. Then, the converted engine coolant temperature value N is stored at the point $P_{32}$.

A predetermined time after the data channel D becomes conductive, the data channel F, which was selected at the point $P_{14}$ during the third program performance, is rendered conductive to transfer the battery voltage indicative voltage $Vi_4$ to the A/D converter 14 and a corresponding value $ti_4$ is obtained. At the end of the fourth A/D converting operation, an interrupt occurs and the program is entered again. The program is transferred through the points $P_1$, $P_6$, $P_{11}$ and $P_{13}$ to the point $P_{15}$ where the channel A is selected and hence through the point $P_{27}$ to the point $P_{30}$ at which a difference $M = ti_4 - tO$ is obtained. At the following point $P_{31}$, the converted value $N = (ti_4 - tO)(V_H)c/(tH - tO)$ is obtained. Following this, the converted battery voltage value N is stored at the point $P_{32}$. Thereafter, the above operation is repeated.

That is, the data gathering system may be constructed to read engine temperature and battery voltage values and determine proper initial spark timing and necessary fuel amount values before the starting motor is driven. This can improve engine starting performance and minimize the duration of rotation of the starting motor.

While the data gathering system of FIG. 4 is shown as including a boosting charge, constant-current discharge type A/D converter 14, it is to be understood, of course, that the data gathering system of the present invention may include a dual ramp A/D converter as shown in FIG. 1.

Figure 8:
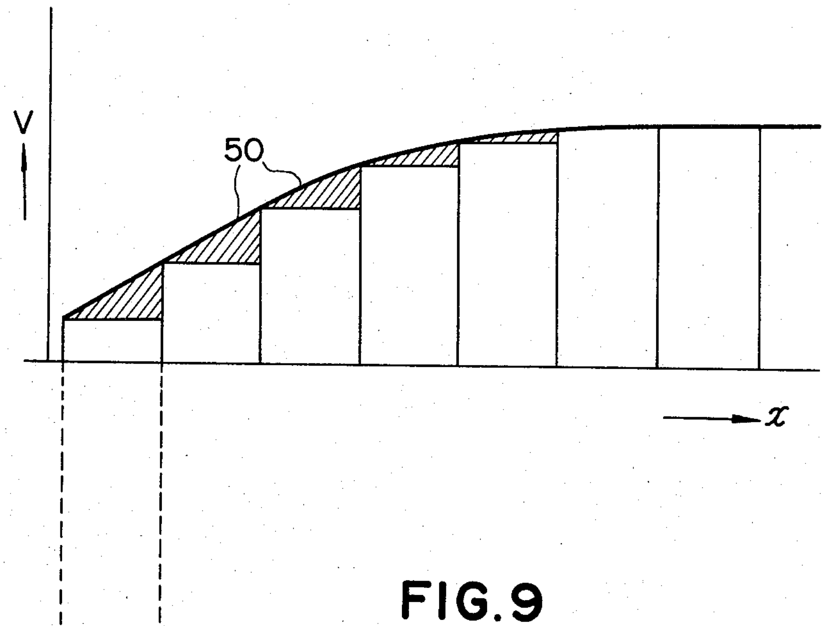
FIGS. 8 and 9 are diagrams showing errors resulting from supply voltage variations in connection with different supply voltage sampling frequencies.
Figure 9:
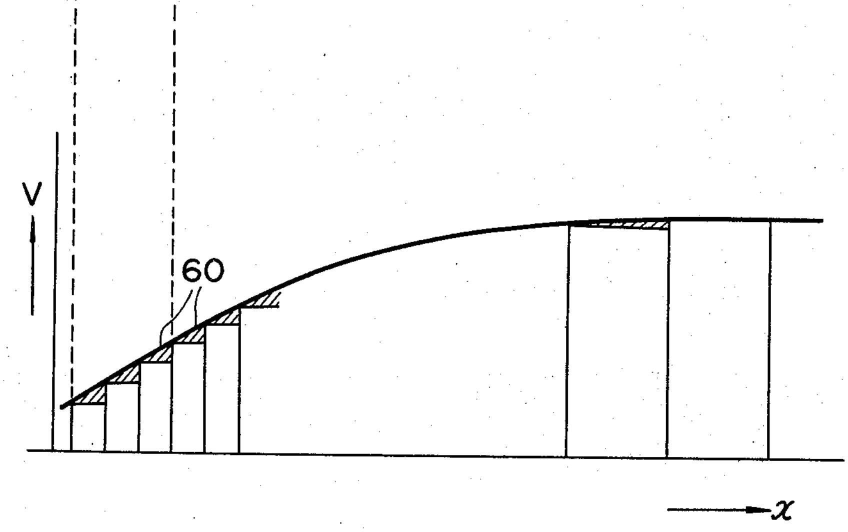

The digital computer 16, is adapted to sample the battery voltage at desired times for calculation of the value Eref with a dual ramp A/D converter or the value $(V_H)c/(tH-tO)$ with a boosting charge, constant-current discharge type A/D converter. If the battery voltage is sampled at a constant frequency regardless of engine operating conditions, large errors, indicated by the hatched areas 50 in FIG. 8, are introduced into the read battery voltage value in the range where large battery voltage variations occur. Such errors can be reduced to an extent as shown by the hatched area 60 in FIG. 9 by increasing the sampling frequency in the range where large battery voltage variations occur; that is, during operation of engine starter motor and actuation of electric loads such as head lights. After the engine is placed into a steady condition, the frequency of sampling of the battery voltage and engine operating variables such as engine temperature or the like which are small in the rate of variation can be reduced. This can reduce the loads of the computer and A/D converter. The computer is adapted to change the priority levels of engine operating variables to be selected and the sampling frequency and timing in accordance with engine operating conditions.

Referring back to FIG. 3, the battery voltage is divided by the resistors $R_1$ and $R_2$. The output Vi of the sensor 26 varies with battery voltage variations. To compensate for such sensor output variations, the divided battery voltage 28 may be read for calculation of the ratio of the sensor output with respect to the divided battery voltage 28. However, this requires the multiplexor 12 to transfer two input signals for each sensor. This can be avoided by connecting the reference voltage source 24 to the battery 20 or varying the output of the power circuit 22 with battery voltage variations.

The reference voltage; that is, the value Eref with a dual ramp A/D converter or the value $V_H$ with a boosting charge, constant-current discharge type A/D converter, is required to be read in a very short time. Thus, noises have a direct effect on the accuracy of reading of the reference voltage. This can be avoided by reading the reference voltage several times in a short time and calculating its average value which is stored and used according to demand. Any converted value which is out of the range between the maximum and minimum permissible voltages is neglected.

The timing of operation of the A/D converter can be set at a desired value by the program of the computer 16. In order to reduce the calculation load of the computer 16, at timer may be used in converting input signals into corresponding digital signals at a predetermined or controlled timing.

Figure 10:
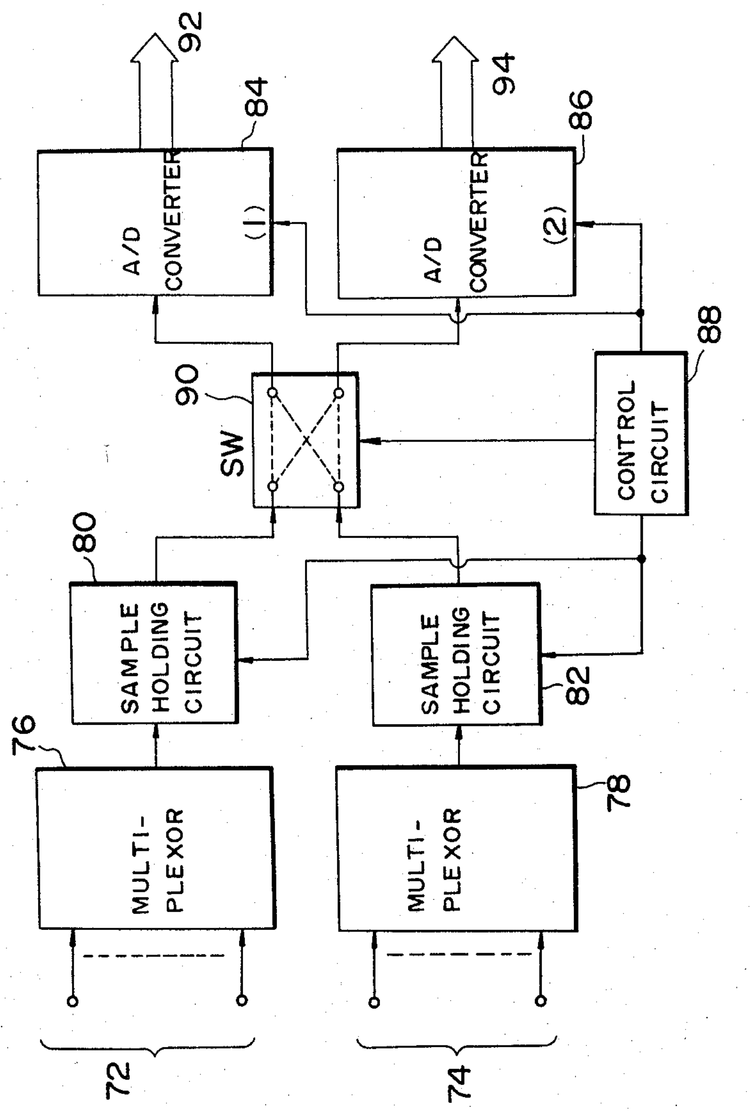
FIG. 10 is a block diagram showing a second embodiment of the present invention.

Referring to FIG. 10, there is illustrated a second embodiment of the present invention wherein two kinds of A/D converters different in operating accuracy and speed are used. The operation of an automotive vehicle is controlled in accordance with various kinds of information on vehicle running conditions. The operating accuracy and speed required for the associated A/D converter are dependent upon the kind of input information and vehicle running conditions. Thus, it is advantageous to use two kinds of A/D converters different in operating accuracy and speed selectively in accordance with vehicle running.

In FIG. 10, input analog signals are divided into first and second groups 72 and 74 according to the requirement for accurate and rapid conversion. The first and second groups of input analog signals are transferred through first and second multiplexors 76 and 78 to first and second sample holding circuits 80 and 82, respectively. A 8-bit A/D converter 84 and a 10-bit A/D converter 86 are selectively connected through a switch circuit 90 to the first and second sample holding circuits 80 and 82 under the control of a control circuit 88.

The timing of operation of the A/D converters 84 and 86 are determined in accordance with a program performed in the computer. It is preferable to determine the timing of operation of the A/D converters and switch circuit using signals representive of engine rotation, acceleration, deceleration, and other engine operating variables. For example, at rapid acceleration and deceleration; that is, at conditions of wide open throttle, the 10-bit A/D converter 86 is selected so as to obtain an accurate output 94.

While this invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A system comprising:

(a) at least one sensor for providing an analog sensor voltage signal related to an engine operating condition;

(b) a first reference voltage source for providing a first predetermined voltage indicative of a first reference value;

(c) a second reference voltage source for providing a second predetermined voltage lower than said first predetermined voltage;

(d) an A/D converter for converting an input analog voltage to a digital value, said A/D converter having an input for receiving said input analog voltage and including a capacitor having first and second terminals, said first terminal being connected to said A/D converter input, and control means for placing said capacitor in a charging mode to permit said capacitor to charge in response to said input analog voltage for a predetermined time period, applying a third predetermined voltage to said capacitor second terminal at the termination of said capacitor charging mode, placing said capacitor in a discharging mode to discharge the same at a constant rate until the voltage at said capacitor first terminal falls to a predetermined value after the termination of said capacitor charging mode, and resetting said capacitor to its initial state;

(e) a multiplexor having data channels for connecting said first and second reference voltage sources and said sensor to said A/D converter input, respectively; and (f) a digital computer for sequentially selecting said multiplexor data channels in a desired order for sequentially coupling said first and second reference voltage sources and said sensor to said A/D converter input, said digital computer storing a digital value corresponding to said first reference value and receiving from said A/D converter and storing digital values for said sensor voltage and said first and second predetermined voltages, and calculating a corrected digital value corresponding to the sensor voltage from said stored digital values.

2. A system according to claim 1, wherein said control means comprises a first switch connected between said capacitor second terminal and ground, a second switch connected between said capacitor second terminal and a reference voltage source, a third switch connected in parallel with said capacitor, a constant current circuit connected between said capacitor first terminal and ground for permitting a constant current flow therethrough when actuated; a comparator for providing a signal when the voltage at said capacitor first terminal is below a reference value, and means for closing said first switch at the start of said capacitor charging mode, opening said first switch, closing said second switch and actuating said constant current circuit a predetermined time after the start of said capacitor charging mode, opening said second switch and closing said first and third switches in response to the signal from said comparator.

3. A system according to claim 1 or 2, wherein said digital computer calculates said corrected digital value N corresponding to the sensor voltage based upon the following equation:

$$N=(ti-tO)\times(V_H)c/(tH-tO)$$

wherein tH, tO and ti are the digital values converted for the first and second predetermined voltages and the sensor voltage, respectively, and $(V_H)c$ is the digital value corresponding to said first reference value.

* * * * *